United States Patent [19]

Suzuki

[11] Patent Number: 5,111,053
[45] Date of Patent: May 5, 1992

[54] CONTROLLING A LIQUID METAL ION SOURCE BY ANALOG FEEDBACK AND DIGITAL CPU CONTROL

[75] Inventor: Katsumi Suzuki, Tokyo, Japan
[73] Assignee: Seiko Instruments, Inc., Tokyo, Japan
[21] Appl. No.: 656,848
[22] Filed: Feb. 19, 1991
[30] Foreign Application Priority Data
  Feb. 19, 1990 [JP] Japan .................................. 2-38076
[51] Int. Cl.⁵ .................................................. H01J 37/08
[52] U.S. Cl. .................................. 250/424; 250/423 R
[58] Field of Search ............... 250/424, 423 R, 423 F, 250/425, 427; 313/167, 362.1; 204/298.01

[56]           References Cited
       U.S. PATENT DOCUMENTS
  4,367,429  1/1983  Wang et al. ...................... 250/423 R
       FOREIGN PATENT DOCUMENTS
  0003462   1/1979  Japan ............................. 250/423 R
  0134461  10/1981  Japan ............................. 250/423 R
  0010546   1/1989  Japan ............................. 250/423 R

OTHER PUBLICATIONS

Shimizu et al. "A Stabilization Method of Ion Beam Current" Japan J. Appl. Phys., vol. 15 (1976), No. 1, pp. 191-192.

Primary Examiner—Jack I. Berman
Assistant Examiner—James E. Beyer
Attorney, Agent, or Firm—Spensley Horn Jubas & Lubitz

[57]           ABSTRACT

Long term stability of a focussed ion beam from a liquid metal ion source is maintained by the combination of a conventional analog feedback technique using a beam current detection, with a superimposed digital control using a CPU which monitors current, beam current and beam extraction voltage to determine the current source state and controls the source to produce optimum operation.

1 Claim, 2 Drawing Sheets

CHANGE OF EXTRACTION VOLTAGE
WITH THE PASSAGE OF TIME

CONTROLLING A LIQUID METAL ION SOURCE BY ANALOG FEEDBACK AND DIGITAL CPU CONTROL

BACKGROUND OF THE INVENTION

The present invention relates to a focussed ion beam (FIB) apparatus using a liquid metal ion source (LMIS).

In the conventional FIB apparatus, the ion beam current is stabilized as follows. As shown in FIG. 2, an ion source 1 is supplied with power from a heater source circuit 8 and thus emits an ion beam 4. A beam current from a monitor electrode 3 is fed back, via a differential amplifier 7 connected to receive an adjustable comparison, or reference, input, to a beam extraction voltage circuit 5 to keep the amount of current flowing into the monitor electrode 3 constant. This is an analog feedback. The analog feedback, which is fast, is capable of sufficiently stable control if the emission conditions of the LMIS do not change.

With LMIS, however, when ions emitted from the end of a needle source 1 strike the extraction electrode 2, sputtered metal atoms released from electrode 2 are adsorbed on the needle end. In addition, gas molecules may also attach to the needle end, contaminating it. As a result, the liquid metal ion flow may change, causing a change in the emission conditions.

At this time, with a simple analog feedback, the beam extraction voltage being monitored is stable, as shown in region A of FIG. 3, before an emission condition changes. When the emission condition changes, the beam extraction voltage increases as in region B or oscillates as in region C. During operation in regions B and C, precision machining or observation is not possible.

SUMMARY OF THE INVENTION

It is the object of this invention to provide an LMIS control method and apparatus which monitors various data of the LMIS and thereby controls the LMIS via a CPU to make the ion beam stable for a long period of time.

To achieve the above and other objects, the invention employs both an analog feedback capable of high-speed feedback and a digital control in which various data, such as emission current, beam current, heater power and beam extraction voltage, are detected and fed to a CPU to optimize heater power, beam extraction voltage and time constant of the feedback circuit in response to changes in the detected data.

One simple example is described herein, in which control is performed according to information obtained from signals taken into a CPU through the above-mentioned circuit. When, for example, the beam extraction voltage gradually increases, as in region B of FIG. 3, the heater power is controlled to increase because the flow of LMIS liquid metal is decreasing. When the beam extraction voltage shows sharp fluctuations, as in region C, the time constant of the analog feedback is to be reduced.

DESCRIPTION OF THE PREFERRED EMBODIMENTS

Figure 1:
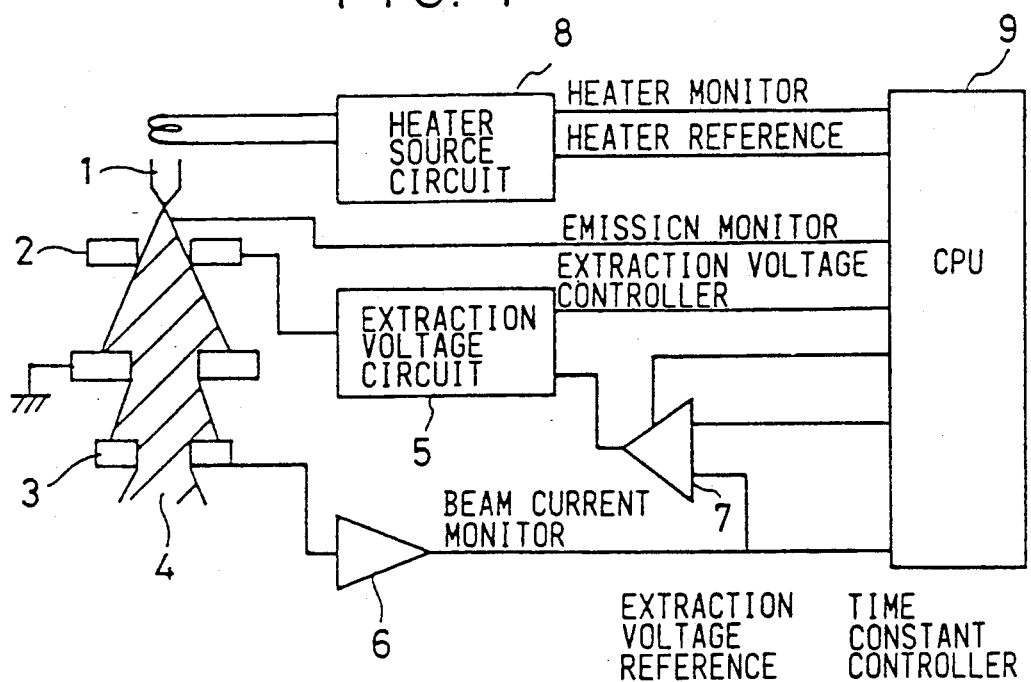
FIG. 1 is a block diagram showing a control system for the liquid metal ion source according to this invention.
Figure 3:
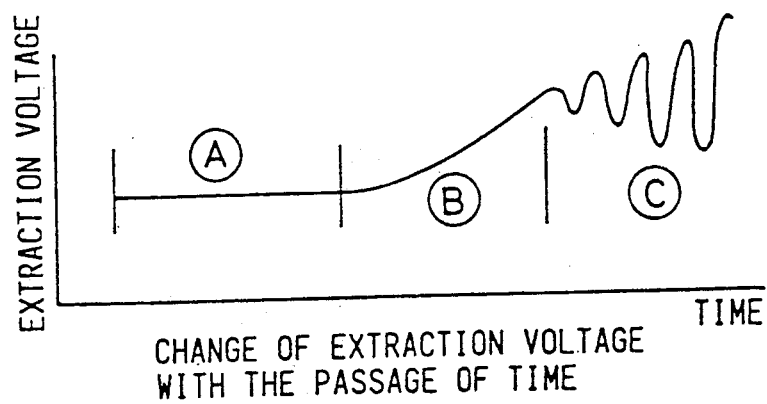
FIG. 3 is a graph showing examples of the beam extraction voltage value which changes with time.

Now, one embodiment of this invention will be described, with reference to FIG. 1. First, a beam extraction voltage reference unit 7 is set to produce a required beam current for a given heater power and a given time constant of analog feedback. When at this time the liquid metal flow is good, the beam extraction voltage on electrode 2 will be constant, as shown in region A of FIG. 3, with the ratio of emission current to beam current remaining constant.

Figure 2:
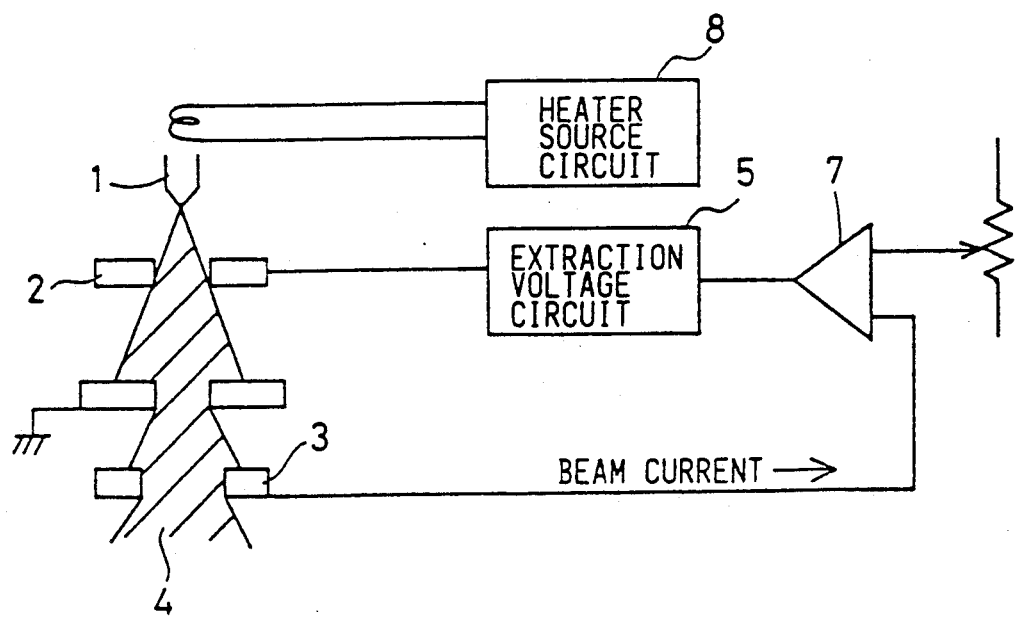
FIG. 2 is a block diagram showing a conventional control system.

In this stable condition, the control method of this invention and the conventional control method of FIG. 2 use the same feedback technique involving essentially the same analog circuit.

However, according to the invention, a CPU 9 checks the operation data of the ion source 1 at all times and participates in the control process only when abnormal conditions are detected, as when there is a change in the beam extraction voltage or emission current. CPU 9 is provided with suitable A/D and D/A converters.

When the emission condition changes with time, the state of the liquid metal ion source 1 is observed based on the data taken in by CPU 9.

Figure 4:
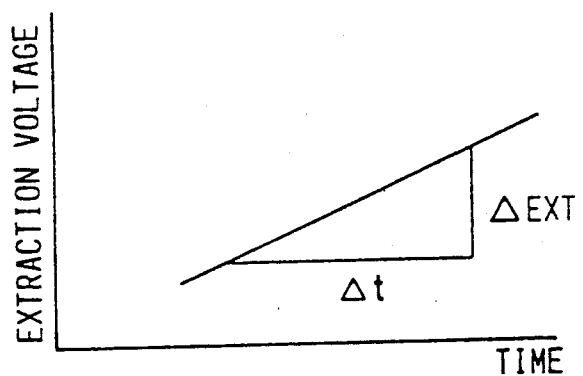
FIG. 4 is a graph showing one example of a beam extraction voltage which changes with time when the operation of the liquid metal ion source is unstable.

Suppose the beam extraction voltage changes over time with a gradient ($\Delta EXT/\Delta t$) as shown in FIG. 4. When the beam extraction voltage is constant, as shown in region A of FIG. 3, then $\Delta EXT/\Delta t \sim 0$. According to the gradient, it is possible to classify the state of the LMIS into (1) fluctuation ($\Delta/EXT\Delta t > k_1$), (2) sharp rise ($k_1 > \Delta EXT/\Delta t > k_2$), (3) rise ($k_2 > \Delta EXT/\Delta t > 0$), and (4) fall ($0 > \Delta EXT/\Delta t$). $k_1$ and $k_2$ are constants whose values are selected to distinguish between different states—rise, sharp rise and fluctuation. During the rising state, the liquid metal flow is considered to be somewhat bad, and thus the heater power should be increased. During the falling state, the liquid metal flow is too high, so that the heater power needs to be lowered. During a sharp rise condition, it can be assumed that foreign substances stick to the needle end and cause a rapid fall in the liquid metal flow. It is therefore required to increase both the heater power and the beam extraction voltage to suddenly excite the liquid metal flow temporarily in order to remove the foreign substances. During a fluctuation state, the heater power should be reduced and the time constant of the analog feedback to extraction electrode 2 is reduced, under control of CPU 9, to make the LMIS state stable.

Figure 5:
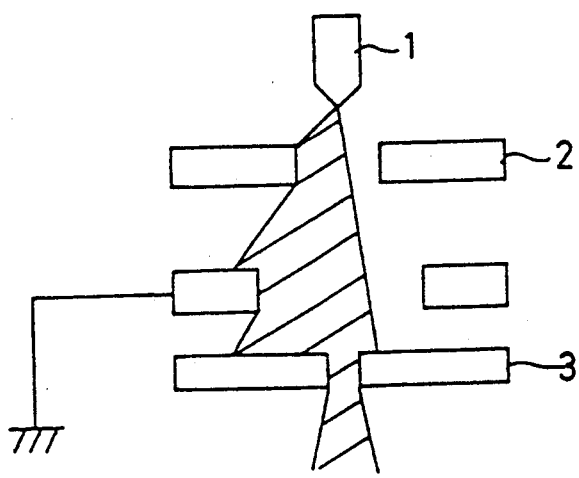
FIG. 5 is a pictorial view illustrating a situation in which the emission direction of the ion source has shifted laterally.

When the ratio of the total emission current and the total beam current exhibits a significant change as a result of foreign substances deposited on the ion generating point 1 and its vicinity, or as a result of nonuniform flow of liquid metal, it is considered to be due to a shift in the ion emission direction (lateral emission) as shown in FIG. 5.

This condition can be corrected by removing foreign substances from the ion generating point and its vicinity. This is accomplished by increasing both the heater power and the beam extraction voltage as mentioned above.

It will be appreciated from the preceding description that the relationships to be controlled by CPU 9 are relatively simple in nature and that CPU 9 may be constructed and programmed to perform its assigned functions in a manner which will be readily apparent to, and within the capabilities of, those skilled in the art.

This application relates to subject matter disclosed in Japanese Application No. 2-38076, filed on Feb. 19, 1990, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects illustrative and not restrictive, the scope of the invention being indicated by the appended claims, rather than the foregoing description, and all changes which come within the meaning and range of equivalency of the claims are therefore intended to be embraced therein.

What is claimed is:

1. A method of controlling a liquid metal ion source used in a focused ion beam apparatus, the source having a metallic needle emitter with a pointed and, a reservoir for supplying liquid metal to the surface of the needle emitter, means for heating the needle emitter and the reservoir, and a beam extraction electrode with a small opening formed therethrough at a position facing the metallic needle emitter to pass an ion beam, the beam extraction electrode being connected to receive a beam extraction voltage for controlling the value of the current in the ion beam, said method comprising the steps of:

performing an analog feedback control including detecting the ion beam by a monitor electrode which conducts a current representative of the ion beam current level and controlling the voltage applied to the beam extraction electrode in response to the monitor electrode current to keep the beam current at a constant value, and performing a digital control including: supplying to a CPU information representative of the ion current emitted by the source, the monitor electrode current, the beam extraction voltage and the power being supplied to the means for heating; estimating the state of the liquid metal ion source from the changes over time of the values represented by the information supplied to the CPU; and controlling at least one of the beam extraction voltage, the heater power and the analog feedback time constant in order to stabilize the operation of the liquid metal ion source.

* * * * *